US012652239B2

(12) United States Patent (10) Patent No.: US 12,652,239 B2
Mikkelson et al. (45) Date of Patent: Jun. 9, 2026

(54) SYNCHRONIZATION FOR BORDER GATEWAY PROTOCOL (BGP) PROCESSES

(71) Applicant: Arista Networks, Inc., Santa Clara, CA (US)

(72) Inventors: Joanne Mikkelson, Milpitas, CA (US); Jesper Skriver, Nicosia (CY); Isidoros Kouvelas, Athens (GR); Sharad Birmiwal, Burnaby (CA)

(73) Assignee: Arista Networks, Onc., Santa Clara, CA (US)

( * ) Notice: Subject to any disclaimer, the term of this patent is extended or adjusted under 35 U.S.C. 154(b) by 493 days.

(21) Appl. No.: 18/154,629

(22) Filed: Jan. 13, 2023

(65) Prior Publication Data

US 2024/0243997 A1    Jul. 18, 2024

(51) Int. Cl.
*H04L 45/42* (2022.01)
*H04L 45/02* (2022.01)
*H04L 45/24* (2022.01)
(52) U.S. Cl.
CPC .............. *H04L 45/42* (2013.01); *H04L 45/02* (2013.01); *H04L 45/24* (2013.01)
(58) Field of Classification Search
CPC .......... H04L 45/42; H04L 45/02; H04L 45/24
USPC ........................................................ 709/238
See application file for complete search history.

(56) References Cited

U.S. PATENT DOCUMENTS

| | | | |
|---|---|---|---|
| 7,230,914 B2 | 6/2007 | Sankar et al. | |
| 7,286,468 B2 | 10/2007 | Scudder et al. | |
| 7,417,947 B1 | 8/2008 | Marques et al. | |
| 7,506,194 B2 | 3/2009 | Appanna et al. | |
| 7,508,772 B1 * | 3/2009 | Ward ..................... | H04L 45/033 |
| | | | 370/254 |
| 7,609,617 B2 | 10/2009 | Appanna et al. | |
| 7,647,426 B2 * | 1/2010 | Patel ........................ | H04L 45/28 |
| | | | 370/254 |
| 7,751,311 B2 | 7/2010 | Ramaiah et al. | |
| 7,787,365 B1 | 8/2010 | Marques et al. | |
| 7,801,135 B2 * | 9/2010 | Appanna ............... | H04L 45/121 |
| | | | 370/254 |
| 7,864,706 B1 * | 1/2011 | Zinjuwadia ............. | H04L 45/04 |
| | | | 370/254 |
| 7,940,650 B1 | 5/2011 | Sandhir et al. | |
| 7,962,602 B1 * | 6/2011 | Peterson ............. | H04L 41/5022 |
| | | | 709/236 |
| 8,005,980 B2 * | 8/2011 | Harvey ................... | H04L 45/00 |
| | | | 709/238 |
| 8,254,396 B2 * | 8/2012 | Appanna ................. | H04L 45/54 |
| | | | 370/255 |
| 8,537,660 B2 | 9/2013 | Ramaiah et al. | |
| 8,769,155 B2 | 7/2014 | Nagappan et al. | |

(Continued)

FOREIGN PATENT DOCUMENTS

| | | | | |
|---|---|---|---|---|
| EP | 2680515 B1 | 3/2017 | | |
| EP | 4064622 A1 * | 9/2022 | ............. | H04L 45/70 |

*Primary Examiner* — Anthony Mejia
(74) *Attorney, Agent, or Firm* — Treyz Law Group, P.C.; Tianyi He

(57) ABSTRACT

A networking system may perform border gateway protocol (BGP) switchover. In particular, the networking system may execute an active BGP process based on a set of received input states and execute a standby BGP process based on the set of received input states independently of the execution of the active BGP process based on the set of received input states.

20 Claims, 7 Drawing Sheets

(56)     References Cited

U.S. PATENT DOCUMENTS

| | | | | |
|---|---|---|---|---|
| 9,013,978 | B2* | 4/2015 | Heitz | H04L 45/583 |
| | | | | 370/218 |
| 9,106,525 | B2 | 8/2015 | Ramaiah et al. | |
| 9,166,904 | B2 | 10/2015 | Appanna | |
| 9,356,859 | B2 | 5/2016 | Hanif et al. | |
| 9,491,107 | B1 | 11/2016 | Scudder et al. | |
| 10,397,189 | B1* | 8/2019 | Hashmi | H04L 63/0272 |
| 2004/0160969 | A1* | 8/2004 | Moon | H04L 45/58 |
| | | | | 370/401 |
| 2006/0233182 | A1* | 10/2006 | Appanna | H04L 45/563 |
| | | | | 370/401 |
| 2007/0064698 | A1* | 3/2007 | Appanna | H04L 45/04 |
| | | | | 370/392 |
| 2007/0086461 | A1* | 4/2007 | Ward | H04L 45/04 |
| | | | | 370/392 |
| 2008/0031239 | A1* | 2/2008 | Kapoor | H04L 45/033 |
| | | | | 370/389 |
| 2010/0265956 | A1 | 10/2010 | Li | |
| 2012/0140616 | A1 | 6/2012 | Zhou et al. | |
| 2021/0067463 | A1* | 3/2021 | Mukhopadhyay | H04L 45/42 |
| 2022/0029911 | A1* | 1/2022 | Zhang | H04L 45/74 |
| 2022/0255835 | A1* | 8/2022 | Mohanty | H04L 12/4641 |
| 2023/0164068 | A1* | 5/2023 | Pradhan | H04L 45/50 |
| | | | | 709/238 |
| 2024/0305553 | A1* | 9/2024 | Vasseur | H04L 43/10 |

* cited by examiner

SYNCHRONIZATION FOR BORDER GATEWAY PROTOCOL (BGP) PROCESSES

BACKGROUND

A communication system includes multiple network devices that are interconnected to form a network for conveying packets from source devices to destination devices. Routing information indicating how (e.g., the routes based on which) the packets are to be conveyed to destination devices are shared amongst one or more sets of peer network devices using Border Gateway Protocol (BGP) established over corresponding Transmission Control Protocol (TCP) sessions between pairs of peer network devices. Each of these peer network devices performs a BGP process to maintain routing information for different purposes (e.g., a local routing information base, one or more incoming routing information bases, one or more outgoing routing information bases, etc.) but ultimately to the aim of receiving, processing, and conveying routing information such as network layer reachability information (NLRI) and path attributes, thereby facilitating the use of BGP amongst its peer network devices.

DETAILED DESCRIPTION

Figure 1:
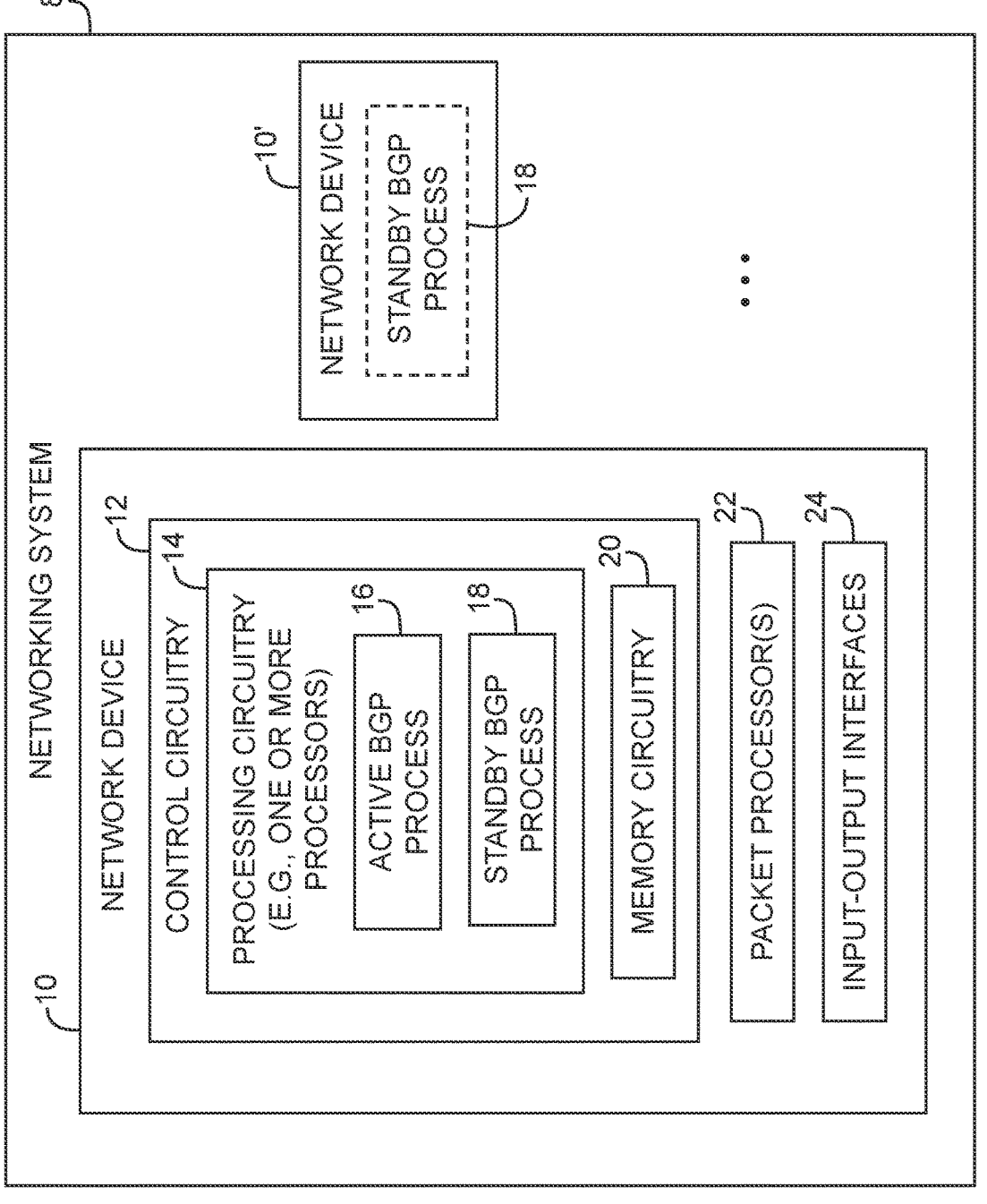
FIG. 1 is a diagram of an illustrative networking system configured to execute an active Border Gateway Protocol (BGP) process and a standby BGP process in accordance with some embodiments.

Network devices such as routers (e.g., multi-layer L2/L3 switches) may use Border Gateway Protocol (BGP) to exchange routing information. As an example, a particular network device may exchange the routing information through BGP with one or more BGP peer network devices over corresponding Transport Control Protocol (TCP) sessions, or if desired, using other reliable transport layer protocols. Each of these network devices may execute a BGP process (sometimes referred to herein as a BGP agent) that facilitates the reception of routing information in BGP messages from one or more BGP peer network devices, the processing of (e.g., route selection based on) the received routing information, and the transmission of routing information in BGP messages to one or more peer network devices, as three illustrative operations among numerous other operations performed by the BGP process.

However, a network device, or more specifically, the BGP process executing on the network device can experience failure events which can lead to a disruption in the exchange of routing information and the network device's role as a BGP peer network device (sometimes referred to as a BGP speaker) to its BGP peer network devices. It may therefore be desirable to provide BGP failover functionalities such that the network device can resolve such failure events and to do so in a manner transparent to its BGP peer network devices (e.g., such that the peer network devices are unaware that the network device and/or the BGP process thereon are experiencing the failure event) to avoid the above-mentioned disruption. Providing BGP failover functionalities or generally preparing the network device to resolve any failure events may consume processing resources at the network device (e.g., processing resources more desirably reserved for normal BGP processing such as path selection, routing information base maintenance, etc., or other control plane functions of the network device). As such, it may further be desirable to minimize processing resource expenditure at the network device when preparing to resolve any failure events to provide BGP failover functionalities.

Accordingly, a networking system may execute a standby BGP process with which the active BGP process on the network device can perform a switchover operation in response to a failure event affecting the active BGP process. The standby BGP process may be executed concurrently (e.g., at least partly synchronized) with the active BGP process using the edge state information received by the active BGP process. In other words, the same edge state information may be received by both the active and standby BGP processes. By conveying edge state information and not internal state information of the active BGP process to the standby BGP process, significant processing resources at the network device may be preserved (e.g., compared to scenarios in which some or all internal state information of the active BGP process are conveyed to the standby BGP process).

Based on this configuration, the standby BGP process may perform routing information decision processing (e.g., route selection) or generally routing information processing in a manner potentially different from that of the active BGP process. While performing different routing information processing may lead to the selection and installation (e.g., storage) of different routes or generally the generation of different BGP process output information between the active and standby BGP processes (e.g., due to timing differences in the reception of routing information and therefore the likely out-of-sync internal states between the active and standby processes), these differences may be reconciled at the switchover process (e.g., shortly before BGP switchover is completed at which point the standby BGP process becomes the active BGP process).

An illustrative networking system configured to provide BGP (process) switchover functionalities in a manner that minimizes disruption of the BGP process for a network device and efficiently utilizes processing resources at the network device in preparation for the BGP process switchover is shown in FIG. 1.

In particular, FIG. 1 is a diagram of an illustrative networking system 8 that includes one or more network devices. Each of the network devices in system 8 maybe a switch (e.g., a multi-layer L2/L3 switch), a router or gateway, a bridge, a hub, a repeater, a firewall, a wireless access point, a device serving other networking functions, a device that includes a combination of these functions, or other types of network devices. Multiple such network devices (e.g., of different types or having different functions) in networking system 8 maybe present and interconnected therebetween and with other network devices in other network portions to form a communications network that forwards traffic (e.g., packets) between end hosts.

The communications network may be implemented with any suitable scope (e.g., as a wide area network, including one or more campus area networks, including one or more local area networks, etc.). If desired, the communications network may include internet service provider networks (e.g., the Internet) or other public service provider networks, private service provider networks (e.g., multiprotocol label switching (MPLS) networks), and/or may include other types of networks such as telecommunication service provider networks (e.g., a long-term evolution (LTE) network).

An illustrative network device of networking system 8 is network device 10. Configurations in which network device 10 includes a router, a switch having L3 (layer 3 or network layer) processing functionalities (e.g., a multi-layer switch), or any other device with network routing functionalities are sometimes described herein as illustrative examples.

As shown in FIG. 1, network device 10 may include control circuitry 12 having processing circuitry 14 and memory circuitry 20, one or more packet processors 22, and input-output interfaces 24 disposed within a housing of network device 10. The housing may include an exterior cover (e.g., a plastic exterior shell, a metal exterior shell, or an exterior shell formed from other rigid or semi-rigid materials) that provides structural support and protection for the components of network device 10 mounted within the housing. In one illustrative arrangement, network device 10 maybe or form part of a modular network device system (e.g., a modular switch system having removably coupled modules usable to flexibly expand the capabilities such as ports, specialized functionalities, etc., of the modular switch system). If desired, the modular system containing network device 10 may also contain other network devices such as network device 10', network devices on line cards, etc. In another illustrative arrangement, network device 10 maybe a fixed-configuration network device (e.g., a fixed-configuration switch having a fixed number of ports and/or a fixed hardware configuration).

Processing circuitry 14 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 14 may run (e.g., execute) a network device operating system and/or other software/firmware that is stored on memory circuitry 20. Memory circuitry 20 may include non-transitory (tangible) computer readable storage media that stores the operating system software and/or any other software code, sometimes referred to as program instructions, software, data, instructions, or code. As an example, the operations described herein for facilitating the BGP switchover as well as other network device control plane functions may be stored as (software) instructions on the non-transitory computer-readable storage media (e.g., in portion(s) of memory circuitry 20 in network device 10).

The corresponding processing circuitry (e.g., one or more processors of processing circuitry 14 in network device 10) may process or execute the respective instructions to perform the corresponding operations (e.g., for facilitating the BGP switchover). Memory circuitry 20 maybe implemented using non-volatile memory (e.g., flash memory or other electrically-programmable read-only memory configured to form a solid-state drive), volatile memory (e.g., static or dynamic random-access memory), hard disk drive storage, and/or other storage circuitry. Processing circuitry 14 and memory circuitry 20 as described above may sometimes be referred to collectively as control circuitry 12 (e.g., implementing a control plane of network device 10).

In particular, processing circuitry 14 may execute network device control plane software such as operating system software, routing policy management software, routing protocol agents or processes (e.g., one or more BGP processes such as active BGP process 16 and optionally standby BGP process 18), routing information base agents, and other control software, may be used to support the operation of protocol clients and/or servers (e.g., to form some or all of a communications protocol stack such as the TCP/IP stack), may be used to support the operation of packet processor(s) 22, may store packet forwarding information, may execute packet processing software, and/or may execute other software instructions that control the functions of network device 10 and the other components therein. While processing circuitry 14 is primarily described herein as executing one or more BGP processes, processing circuitry 14 may also execute one or more other network routing protocol agents or processes. As examples, these other network protocol agents may implement non-BGP distance vector routing protocols, Exterior Gateway Protocol (EGP), Interior Gateway Protocols (IGP) such as Enhanced Interior Gateway Routing Protocol (EIGRP), Immediate system-to-immediate system (IS-IS) protocol, Routing Information Protocol (RIP), or Open Shortest Path First (OSPF) protocol, Label Distribution Protocol (LDP), Multiprotocol Label Switching (MPLS), or other (Internet) routing protocols (just to name a few).

Packet processor(s) 22 maybe used to implement a data plane or forwarding plane of network device 10. Packet processor(s) 22 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 22 may receive incoming data packets via input-output interfaces 24 (e.g., ports), parse and analyze the received data packets, process the packets based on packet forwarding decision data (e.g., in a forwarding information base) and/or in accordance with network protocol(s) or other forwarding policy, and forward (or drop) the data packet accordingly. The packet forwarding decision data may be stored on a portion of memory circuitry 20 and/or other memory circuitry integrated as part of or separate from packet processor 22.

Input-output interfaces 24 may include communication interface components such as an Ethernet interface (e.g., one or more Ethernet ports), an optical interface, a Bluetooth interface, a Wi-Fi interface, and/or other networking interfaces for connecting network device 10 to the Internet, a local area network, a wide area network, a mobile network, other portions of the communications network, and/or to other network device(s), peripheral devices, and/or other computing equipment (e.g., host equipment, user equipment, etc.). Network device 10 may also include other components such as a system bus or connector(s) that couple the components of network device 10 to one another, power management components, thermal management components, etc.

In the example of FIG. 1, processing circuitry 14 may execute a BGP process (sometimes referred to herein as a BGP agent) such as active BGP process 16 to exchange network routing information and network device capabilities with other network devices (sometimes referred to herein as peer network devices or BGP peer network devices). Accordingly, network device 10 may be a BGP peer network device or BGP speaker to its BGP peer network devices. In particular, each BGP peer network device may be associated with an Autonomous System (AS) and may be used to advertise information indicative of the reachability of destinations through the AS. If desired, multiple BGP speakers or peer network devices may exist within each AS. BGP uses TCP as its transport protocol. Accordingly, network device 10 may establish a TCP session with each peer network device and may exchange BGP messages over each of these TCP sessions with a corresponding BGP peer network device. The exchanged network routing information may be used to generate or otherwise inform (e.g., affect the generation of) the packet forwarding decision data and therefore the packet forwarding behavior of packet processor(s) 22, among other functions.

Network device 10 and the components therein, such as control circuitry 12, one or more processors of processing circuitry 14, and/or even software executing on the one or more processors, can experience unplanned downtime or failure events, which can disrupt the execution of active BGP process 16. Accordingly, a separate BGP process such as standby BGP process 18 may also execute on processing circuitry 14 in device 10 or elsewhere in networking system 8 such as at network device 10' (e.g., on processing circuitry of network device 10' executing on software instructions for standby BGP process 18 stored on memory circuitry of network device 10'). In illustrative configurations described herein as an example, network device 10' may have at least the same components and/or functionalities as described for network device 10 (e.g., be another instance of network device 10). If desired, network device 10' may omit some of the components or functionalities of network device 10, and/or may include additional components or functionalities than those described for network device 10.

In general, active BGP process 16 and standby BGP process 18 may be executed on the same processor or on any combination of different processors. As just a few examples, active and standby BGP processes 16 and 18 may be executed on the same processor of processing circuitry 14, can be executed on two different processors for processing circuitry 14 in the same network device 10, or can be executed on respective processors of two different network devices 10 and 10' (e.g., in configurations where network devices 10 and 10' are housed in the same housing and/or mounted to the same chassis to respectively implement active and standby control plane supervisors on the same modular network device system having removably coupled line card module(s) inter-coupled via a backplane). If desired, network devices 10 and 10' may be distant standalone devices (e.g., fixed-configuration network devices having their own respective housings). In other illustrative arrangements, the active BGP process may be executed on a processor on local equipment (e.g., on network device 10) and the standby BGP process may be executed on computing resources on remote server equipment in networking system 8 (e.g., communicatively coupled through the communications network to network device 10).

Figure 2:
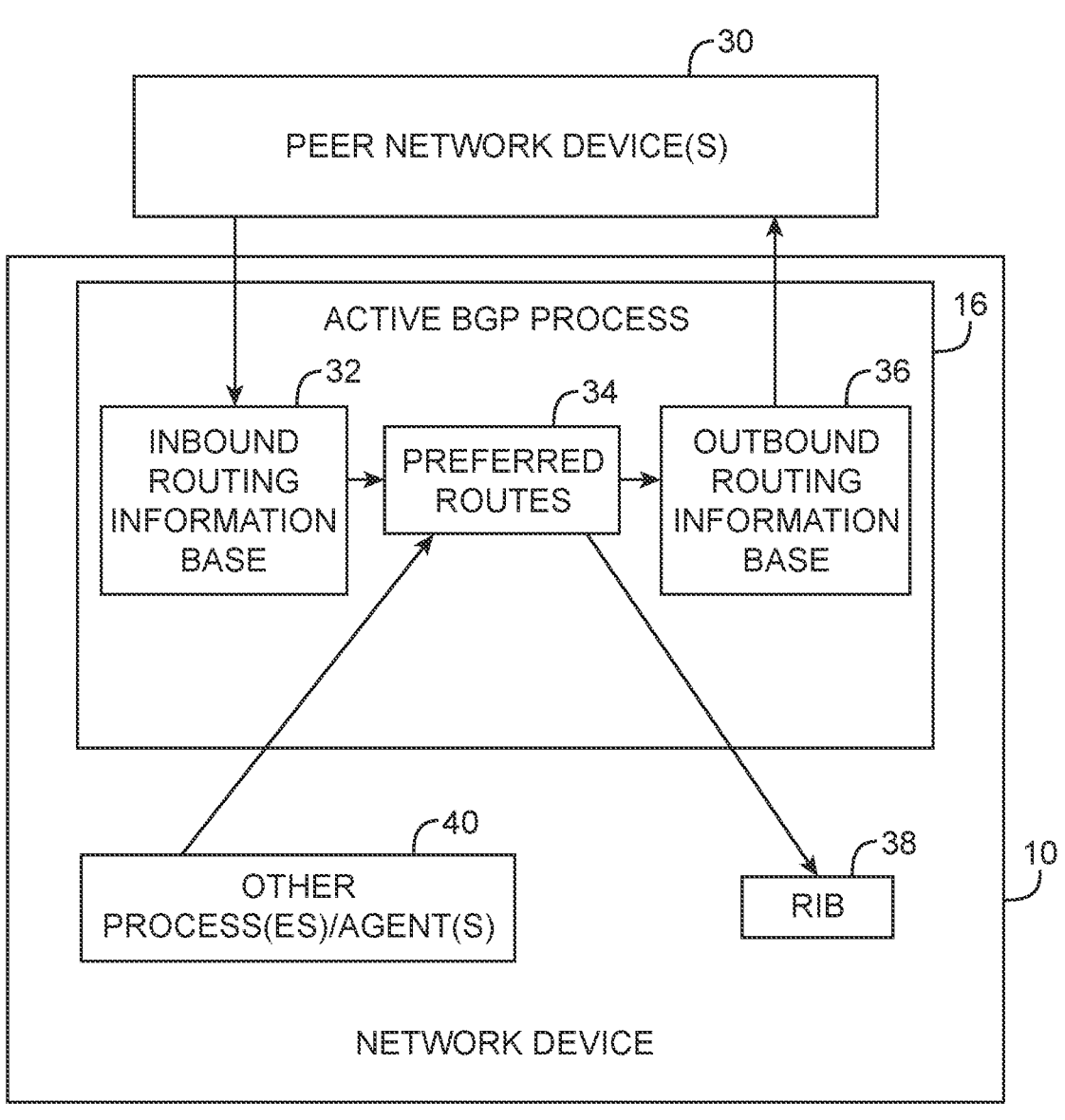
FIG. 2 is a diagram of an illustrative network device configured to communicate with one or more BGP peer network devices and to perform a BGP process in accordance with some embodiments.

FIG. 2 is a diagram of an illustrative BGP process such as active BGP process 16 executing on network device 10 (e.g., software instructions stored on memory circuitry 20 executed by processing circuitry 14 in FIG. 1). Active BGP process 16 may exchange network routing information (e.g., path attributes, network layer reachability information (NLRI), and withdrawn NLRI) with one or more peer network devices 30 on which respective BGP processes execute. A peer network device 30 and network device 10 running active BGP process 16 may communicate via BGP connections established over corresponding TCP sessions.

In particular, active BGP process 16 may receive routing information such as NLRIs, path attributes, and withdrawn NLRIs, from one or more peer network devices 30 over corresponding TCP session(s). The destinations (e.g., the set of IP (Internet Protocol) addresses defined by an IP prefix) specified by the NLRI and the path attributes associated with the destinations of the NLRI, collectively, are sometimes described herein as a route, whereas the path attributes themselves define a path for the route.

The received routing information may be stored at inbound routing information base (RIB) 32 (sometimes referred to as incoming routing information base 32 or adj-rib-in 32). Active BGP process 16 may maintain the incoming routing information (e.g., a collection of routes) at inbound RIB 32 by updating the collection of received routes as new BGP messages are received from peer network devices 30. Inbound RIB 32 may contain different versions of routes received from peer network devices 30. As examples, the routes stored at inbound RIB 32 may include raw or unmodified versions of routes received from peer network devices 30 and/or may include modified versions of routes received from peer network devices 30 (e.g., routes resulting from filtering and/or inbound policy being applied). Regardless of the version(s) of received routes stored at inbound RIB 32, (at least some of) these stored routes may await further processing via BGP route selection.

While inbound RIB 32 is illustrated in the example of FIG. 2 as a single structure, inbound RIB 32 may include multiple portions (e.g., may represent multiple smaller RIBs) organized in any suitable manner. As some illustrative examples of organization, each smaller RIB portion may be associated with a different peer network device 30 or a group of peer network devices 30, thereby containing routes advertised or announced by that peer network device 30 or by multiple peer network devices 30 in the same group. If desired, inbound RIB 32, through the smaller RIB portions therein, may be organized by BGP address family, by common inbound policy, or by any other desired common route or peer characteristic.

Active BGP process 16 may perform, among other operations, the (primary) operation of BGP route selection (e.g., a route or path select operation sometimes referred to as a best path algorithm or a best path selection operation) to generate or otherwise identify a collection of preferred routes 34 for different destinations sometimes referred to as (active) BGP routes. In particular, active BGP process 16 may perform route selection, for each set of destinations (e.g., IP prefixes defined by NLRI), based path attributes and other path information advertised by peer network devices 30 stored at inbound RIB 32 and based on information not advertised by peer network devices 30 such as information indicative of routing policies (e.g., manually configured by a network administrator or user), information provided by other routing protocol processes or agents, etc. By processing the different information stored at inbound RIB 32 (e.g., different routes advertised by different peer network devices 30 to the same destinations) along with other inputs from other processes/agents 40 (e.g., routing policy information from policy agents, routing protocol information such as redistributed path information, path attribute information, next hop reachability information, etc., from other routing protocol agents), active BGP process 16 may select a set of preferred routes 34. Active BGP process 16 may maintain a local RIB (e.g., local to active BGP process 16) to store the set of selected preferred routes 34.

As an illustrative example of the route selection operation, active BGP process 16 may compare at least two routes to the same network destination (e.g., IP prefix defined by NLRI). These two routes to the same destination may be obtained from inbound RIB 32 (e.g., as part of a first advertised route from a first peer network device 30 and/or a second advertised route from a second peer network device 30) and/or from the local RIB (e.g., one or more preferred routes from a previously performed route selection). Active BGP process 16 may compare the different paths (e.g., their path attributes) to arrive at a new (preferred) path to the destination and therefore the new preferred route 34.

This comparison may be based on a comparison of different path attributes or parameters associated with the paths being compared. As examples, the compared path attributes or parameters, in order of comparison as performed by active BGP process 16, may be the local weight of each path (e.g., with higher weights preferred), the local preference for each path, whether a path originated locally via an aggregate or a network, the shortest AS_PATH (Autonomous System path), origin type of each path (e.g., Exterior Gateway Protocol (EGP) preferred over Interior Gateway Protocol (IGP)), multi exit discriminator (MED) for each path (e.g., with lower MED preferred), whether each path is external BGP or internal BGP (e.g., external BGP preferred over internal BGP), IGP metric of each path (e.g., with lower IGP metric to the BGP next hop preferred), order of paths received (e.g., first received path preferred), router ID of BGP peer network device from which each path is received (e.g., with lower router ID preferred), cluster list of each path (e.g., with lower length of cluster list preferred), and neighbor address of each path (e.g., with lower neighbor address preferred). The new preferred route resulting from one or more comparisons based on the one or more abovementioned path attributes or parameters may then be stored at the local RIB as the best path for the destination.

If desired, prior to the comparison, active BGP process 16 may alter one or more path attributes of, filter out, and/or generally process the one or more routes to influence and change the result of the comparison (e.g., to arrive at or select a preferred route 34 resulting from the comparison that otherwise would not have been selected or preferred). In the example of FIG. 2, active BGP process 16 may receive information from one or more external sources such as other processes or agents 40 and may use this received information to alter, filter, and/or generally process the one or more routes for comparison prior to the comparison. In particular, other processes or agents 40 may include routing policy agent(s) (e.g., as part of routing policy management software, containing and managing policy information base(s), etc.) that implement routing policies or otherwise provide policy information to active BGP process 16, may include routing protocol agent(s) or other processes that provide next hop reachability information (e.g., indicating whether the next hops of routes are reachable), distributed paths and their attributes (e.g., from an IGP protocol agent), and/or generally other processes or agents 40 that provide inputs to the BGP decision process (e.g., BGP route selection). As an example, the policy information may alter path attributes (e.g., weight, local preference, etc.) of routes based on the route matching one or more criteria set by the policy. In general, the routing policies may be customized by and received as user (e.g., network administrator) input.

As desired, one or more stored preferred routes 34 at the local RIB may be installed or stored at the routing information base (RIB) 38 for network device 10. RIB 38 (sometimes referred to as main RIB 38 or network device RIB 38) may include routes based on which packet forwarding decision data is generated (e.g., for use by packet processor(s) 22 in FIG. 1). Depending on the configuration of network device 10, the BGP preferred route may not always be installed on RIB 38 (e.g., routes from other protocol agents such as IGP agents and/or static routes may instead be installed on RIB 38 for any particular destination or network IP prefix).

One or more stored preferred routes 34 at the local RIB may further be conveyed to and stored on outbound RIB 36 (sometimes referred to as outgoing RIB 36 or adj-rib-out 36) for advertisement to one or more peer network devices 30 as routing information (e.g., NLRIs and path attributes). Active BGP process 16 may maintain the outgoing routing information (e.g., a collection of routes) at outbound RIB 36 by storing not yet advertised routing information. Active BGP process 16 may convey the routing information for advertisement to each peer network device 30 over a corresponding TCP session with that peer network device 30. The set of peer network devices 30 from which advertised routing information is received may be the same or may be different from the set of peer network devices 30 to which advertised routing information is transmitted.

While outbound RIB 36 is illustrated in the example of FIG. 2 as a single structure, outbound RIB 36 may include multiple portions (e.g., may represent multiple smaller RIBs) organized in any suitable manner. As some illustrative examples of organization, each smaller RIB portion may be associated with a different peer network device 30 or a group of peer network devices 30, thereby containing routes to be advertised or announced to that peer network device 30 or to multiple peer network devices 30 in the same group. If desired, outbound RIB 36, through the smaller RIB portions therein, may be organized by BGP address family, by common outbound policy, or by any other desired common route or peer characteristic.

While inbound RIB 32, the local RIB storing preferred routes 34, outbound RIB 36, and main RIB 38 are sometimes referred to herein as separate data structures for storing separate routing information, if desired, the different RIBs many be implemented on a shared data storage structure and/or across any combination of data storage(s) (e.g., on memory circuitry 20 in FIG. 1). Configurations in which inbound RIB 32, the local RIB storing preferred routes 34, and outbound RIB 36 are stored on a shared data storage circuit on memory circuitry 20, while main RIB 38 is stored on a separate data storage circuit on memory circuitry 20 are sometimes described herein as an illustrative example.

Figure 3:
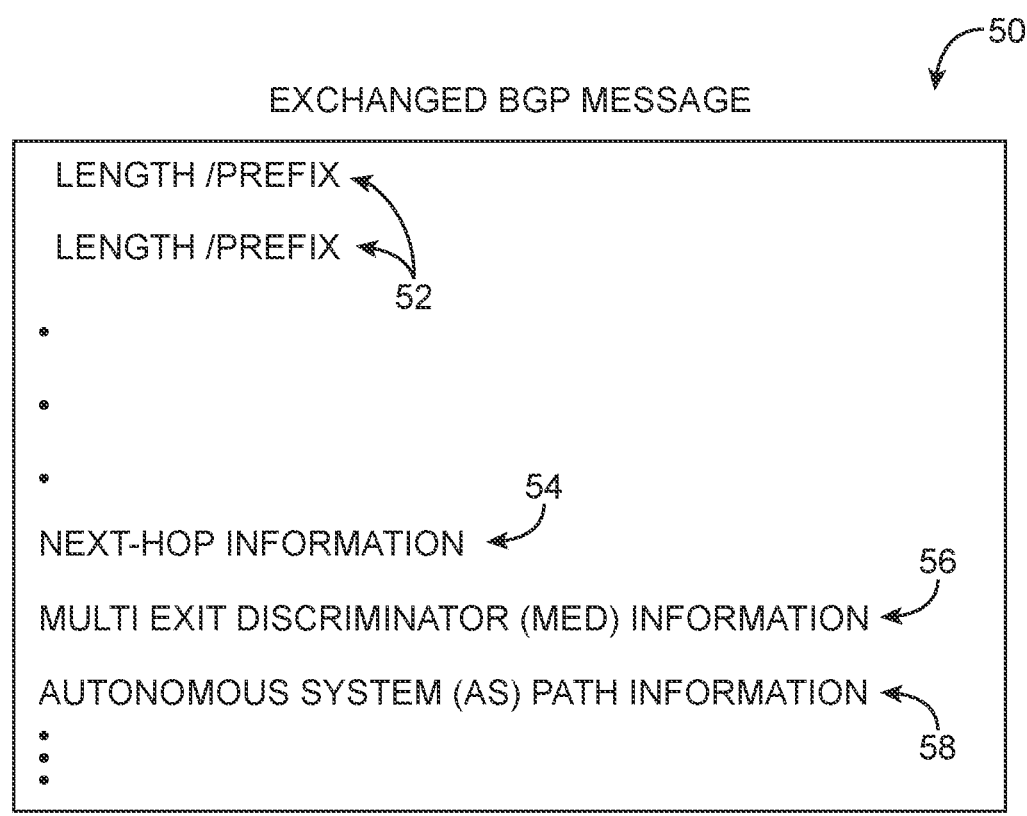
FIG. 3 is a diagram of an illustrative BGP message communicated between BGP peer network devices in accordance with some embodiments.

FIG. 3 is a diagram of illustrative BGP message received by network device 10 from a peer network device 30 and/or sent to a peer network device 30 by network device 10 via TCP session(s) (e.g., encapsulated with TCP/IP headers).

BGP messages such as BGP message 50 may generally be conveyed between peer BGP network devices when the BGP session is initiated, periodically as BGP update messages containing (newly) advertised (and/or withdrawn) routes, and/or at any other suitable time. In particular, BGP message 50 may include NLRI 52 that specifies one or more network destinations (e.g., IP addresses) defined using corresponding sets of a length and a network (e.g., IP) prefix (e.g., 2-tuples) that are reachable by the transmitting peer network device. In particular, the length may represent a network mask (e.g., in Classless Inter-Domain Routing notation such as /8, /16, /23, /24, /25, etc.) to apply to the prefix and the prefix may represent one or more network addresses for the subnet (e.g., an IP prefix containing trailing bits to an octet boundary that specifies network IP addresses for the subnet).

Additionally, BGP message 50 may include path attributes that define the path advertised in the BGP message. Each pair of a length and a network prefix (specified by NLRI 52) defines a set of destinations, which in combination with the corresponding path attributes for the path, may sometimes be referred to herein as a route for the set of destinations.

In the example of FIG. 3, the path attributes are shown to include next-hop information 54 (e.g., information indicative of the IP address of the border router that should be used as the next hop to the destination of the route(s) specified in NLRI 52), multi exit discriminator (MED) information 56 (e.g., used to discriminate between multiple exit points to a neighboring Autonomous System), Autonomous System path information 58 such as a set or sequence of AS path segments. However, other required and/or desired paths attributes may also be present in BGP message 50. These path attributes may include origin information indicative of the origin of the routing information (e.g., an attribute generated by and indicative of the original BGP speaker from which the routing information originated), local preference information indicative of the degree of preference for an advertised route, an atomic aggregate attribute, an aggregator attribute, etc. While not explicitly illustrated in the example of FIG. 3, BGP update messages (e.g., BGP message 50) may also include information indicative of withdrawn routes (e.g., destinations or NLRIs that have become unreachable and are being withdrawn from service) and length indicators indicative of length of path attributes, NLRIs, etc.). The order of information present in BGP message 50 in FIG. 3 is merely illustrative and may be different than shown in FIG. 3.

The example of FIG. 3 is merely illustrative. In general, BGP messages conveyed between peer devices may include update messages, route refresh messages, keepalive messages, notification messages, and/or other types of BGP/TCP messages or packets.

In one illustrative scenario described as an example, active BGP process 16 (FIG. 2) in receipt of BGP message 50 may first store the received NLRI 52 and path attributes advertised by a peer network device 30 in inbound RIB 32. During processing, active BGP process 16 may use one or more of the path attributes (e.g., information 54, 56, and 58 and/or other path attributes) for received NLRI 52 to compare with analogous path attributes for another route (e.g., in inbound RIB 32 or in the local RIB storing preferred routes 34) to perform its route selection operation. If preferred, the route (or multiple routes, if specified) advertised in BGP message 50 and stored at inbound RIB 32 may be installed as a preferred route (e.g., replacing the previously preferred route) for the NLRI-specified destinations on the local RIB of active BGP process 16. The route may optionally be installed in main RIB 38 of network device 10 and/or may optionally be installed in outbound RIB 36 for advertisement to other peer network devices 30 (FIG. 2).

A network device can experience unplanned downtime or failure events which disrupt the BGP process executing on the network device. While the network device can restart its BGP process, it can take a significant amount of time until the newly restarted BGP process is fully recovered (e.g., has obtained all necessary internal states such as the different routes on the different RIBs to continue normal BGP process operations as performed prior to the disruption). As an example, to be fully recovered, the BGP process may need to re-establish BGP sessions over TCP sessions with its BGP peer network devices, receive the corresponding incoming routing formation (e.g., routes) through the re-established sessions for storage at the inbound RIB, compute preferred routes for storage at the local RIB, populate the outbound RIB with preferred routes for advertisement, and advertise the corresponding outgoing routing information (e.g., routes) through the re-established BGP sessions to its BGP peer network devices.

To reduce this recovery time following a failure event, a standby BGP process may be provided concurrently with the active BGP process. In order to facilitate a seamless transition from the active BGP process to the standby BGP process in response to the failure event, the standby BGP process may be entirely synchronized with the active BGP process such that the standby BGP can take over as the active BGP process during switchover (e.g., in response to the failure event).

However, this type of synchronization between the active and standby BGP processes may require pre-populating all states of standby BGP process with the same corresponding states of the active BGP process and may include the sharing of states of the inbound RIB, the local RIB, and the outbound RIB (e.g., the collection of routes at each RIB and other routing information), other information used to perform the BGP route selection operation and identify the preferred routes, and in general, any other internal states of the active BGP process. Furthermore, the standby BGP process may need to also ensure that the same processing operations and the resulting decisions (e.g., preferred route decisions, routes for advertisement, etc.) as those performed and reached in the active BGP process are also performed and reached at the standby BGP process. This is particularly necessary for operations and decisions that are timing-sensitive because any deviations between the active and standby BGP process may result in improper states being used after switchover. As such, performing this type of synchronization may be undesirable as it is computing resource intensive (e.g., takes computing resource away from the normal BGP route selection and route advertisement process and other processor operations) and requires complex lock-step exchanges between the active and standby processes (e.g., to ensure that the numerous internal states in the active BGP process are mirrored to the standby BGP process and with the analogous timing).

To mitigate these issues, a networking system such as networking system 8 (FIG. 1) may provide a standby BGP process 18 configured to receive edge states (sometimes referred to herein as external states or states external to the BGP process) of active BGP process 16 (e.g., received by active BGP process 16). By receiving edge states, standby BGP process 18 may still pre-populate its internal states and be ready for BGP switchover. However, instead of mirroring or receiving copies of internal states of active BGP process 16, standby BGP process 18 may be configured to perform internal BGP processing (e.g., route selection decisions to populate its local RIB, route advertisement decisions to populate its outbound RIB, etc.) independent of the internal BGP processing of active BGP process 16 such that internal states of standby BGP process 18 can deviate from the internal states of active BGP process 16.

Figure 4:
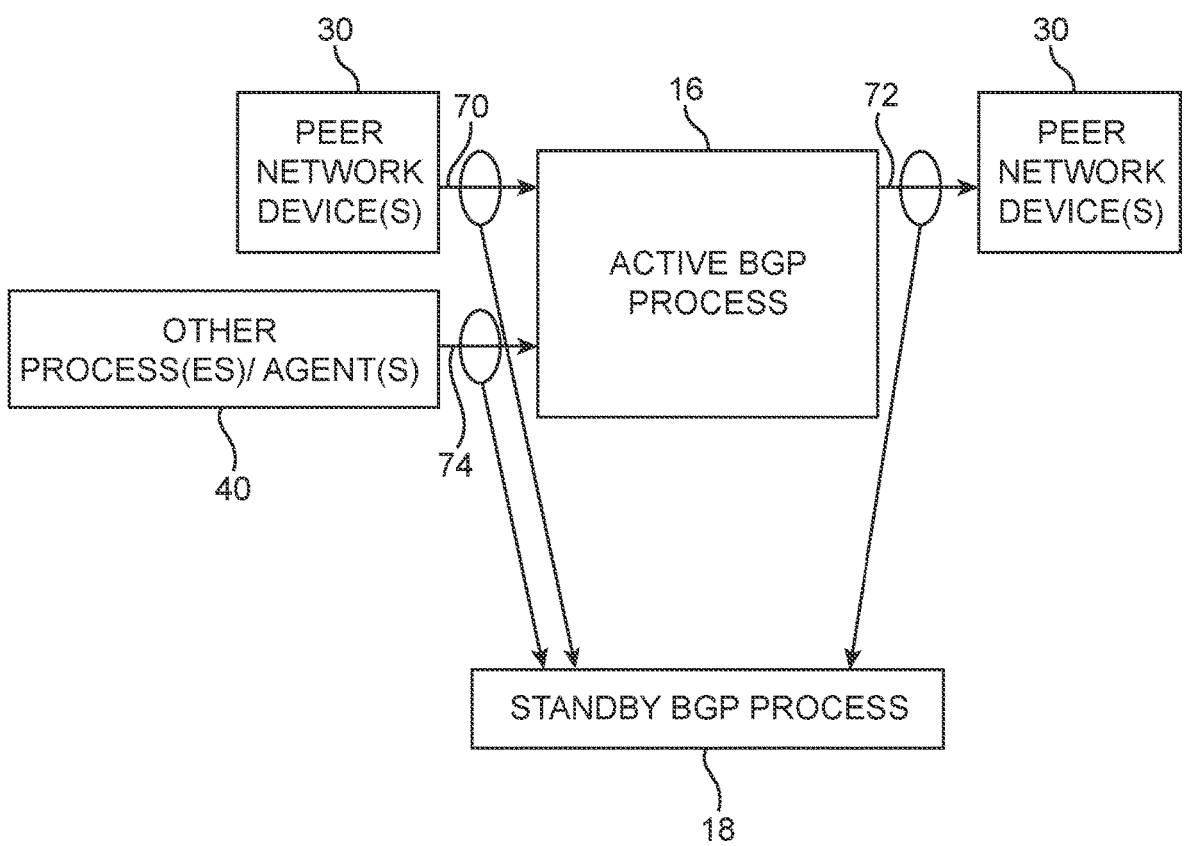
FIG. 4 is a diagram of an illustrative configuration for performing a standby BGP process concurrently with an active BGP process in accordance with some embodiments.

FIG. 4 is a diagram illustrating the sharing of edge states between active BGP process 16 and standby BGP process 18. As shown in FIG. 4, active BGP process 16 may receive input information (sometimes referred to herein as input states) and may convey output information (sometimes referred to herein as output states). These input and output states are sometimes referred to as edge states or external states. The input states may be the received peer-advertised routes and/or other routing and policy information used as inputs to execute active BGP process 16 (e.g., to populate inbound RIB 32 in FIG. 2, to perform route selection and identify or generally obtain preferred routes 34 in FIG. 2 that populate the local RIB, to perform advertisement decisions by determining which preferred routes are used to populate outbound RIB 36). The output states may be the preferred routes (e.g., at outbound RIB 36) and/or other routing information for advertisement that are the output from active BGP process 16 and ultimately announced to peer network devices.

In the example of FIG. 4, active BGP process 16 may receive input states from one or more peer network devices 30 via one or more corresponding communications links 70 (e.g., over TCP session(s) by conveying TCP/IP header encapsulated BGP messages). Active BGP process 16 may also receive input states from one or more other processes and/or agents 40 such as a routing policy agent or manager, a routing protocol agent, etc., (e.g., executing on processing circuitry 14 in FIG. 1 or other processing circuitry) via one or more corresponding communications links 74 (e.g., a software path within a processor in scenarios in which active BGP process 16 and other processes or agents 40 are running on the same processor, a hardware path between different processors in scenarios in which active BGP process 16 and other processes or agents 40 are running on different processors, a combination of a hardware path and a software path, etc.). If desired, active BGP process 16 may receive input states from any suitable set of sources (e.g., one or more sources other than peer network devices 30 and other processes or agents 40) in order to provide inputs to execute active BGP process 16.

While not explicitly shown in FIG. 4, a corresponding synchronization manager may be implemented at each of active BGP process 16 and standby BGP process 18. The respective synchronization managers of active BGP process 16 and standby BGP process 18 may be configured to control the synchronization or sharing of input and output states between active BGP process 16 and standby BGP process 18, and more generally, to control the operations as described herein with respect to preparing for and performing BGP switchover. As an example, the respective synchronization managers of active BGP process 16 and standby BGP process 18 may communication with each other (e.g., over a communication channel such as a TCP session) to coordinate state synchronization, perform state maintenance, and/or perform other state management functions within active BGP process 16, within standby BGP process 18, between active BGP process 16 and standby BGP process 18, within networking system 8, etc.

Active BGP process 16 may use the received input states (e.g., perform processing on the input states, produce resulting decisions based on the input states, etc.) to obtain (e.g., generate, select, identify, etc.) output states. In the example of FIG. 4, active BGP process 16 may transmit output states to one or more peer network devices 30 via one or more corresponding communications links 72 (e.g., over TCP session(s) by conveying TCP/IP header encapsulated BGP messages). If desired, active BGP process 16 may transmit output states to any suitable set of destinations (e.g., one or more destinations other than BGP peer network devices 30).

To prepare standby BGP process 18 to take over operation as the new active BGP process in response to a failure event, input states received by and output states produced by active BGP process 16 may also be conveyed to standby BGP process 18. In some illustrative configurations described herein as an example, active BGP process 16 may first receive and store the input states (e.g., routing information over communications links 70) and may subsequently forward copies of the received input states to standby BGP process 18. Copies of the input states may be made and forwarded to standby BGP process 18 after reaching storage (e.g., inbound RIB 32 in FIG. 2) for active BGP process 16. For example, one or more TCP sessions may be established between the inbound RIB for active BGP process 16 and the inbound RIB for standby BGP process 18 (e.g., by respective synchronization managers executing for active BGP process 16 and standby BGP process 18) to synchronize these input states. As such, copies of the input states may be conveyed over these TCP session(s). The concepts of the disclosure are not limited to TCP and various implementations could use other suitable communications protocols (e.g., other reliable transport layer protocols usable to convey BGP messages).

In some illustrative configurations described herein as an example, active BGP process 16 may forward copies of the output states to standby BGP process 18 as these output states are generated (e.g., based on advertisement decisions performed by active BGP process 16) and stored (e.g., at outbound RIB 36 in FIG. 2) for active BGP process 16. If desired, copies of the output states may be made and forwarded to standby BGP process 18 after reaching storage (e.g., outbound RIB 36) for active BGP process 16 and/or prior to the output states being output for advertisement to one or more BGP peer network devices 30. In particular, one or more TCP sessions may be established between the outbound RIB for active BGP process 16 and the outbound RIB for standby BGP process 18 (e.g., by the respective synchronization managers executing for active BGP process 16 and standby BGP process 18) to synchronize these output states. As such, copies of the output states may be conveyed over these TCP session(s).

In general, depending on the implementation of active BGP process 16 and standby BGP process 18, these edge states may be conveyed over any one or combination of a software path within one or more processors, a hardware path (e.g., signal traces and/or system busses) connecting different processors, a connector (e.g., a cable) connecting different network devices respectively implementing active and standby BGP processes over Ethernet interfaces, and a network path (e.g., through one or more intervening network devices of networking system 8 in FIG. 1). If desired, at least some of these edge states (e.g., input and/or output states) received or to be received by active BGP process 16 may be shared with standby BGP process 18 in other suitable manners (e.g., internal processes and/or agents may forward information to both active and standby BGP processes over separately communications links, the respective synchronization managers executing for active BGP process 16 and standby BGP process 18 may establish a TCP session therebetween and convey edge state information over the TCP session).

As shown in FIG. 4, the operations of active BGP process 16 and standby BGP process 18 may be synchronized only on the basis of these edge or external states (e.g., input and output states) and not internal states generated by active BGP process 16 (e.g., results from the route selection operation, the collection of routes generated for storage at the local RIB of active BGP process 16, etc.). By synchronizing the edge states (e.g., states stored at the inbound RIBs, states stored at the outbound RIBs) or more generally states external to active BGP process 16, standby BGP process 18 may still receive sufficient information to maintain mostly the same internal states as active BGP process 16. Accordingly, standby BGP process 18 may only need to perform minimal operations (e.g., difference reconciliation operations) after initiating the BGP process switchover in response to the failure event and therefore can take over as the new active BGP process in a relatively quick manner.

Figure 5:
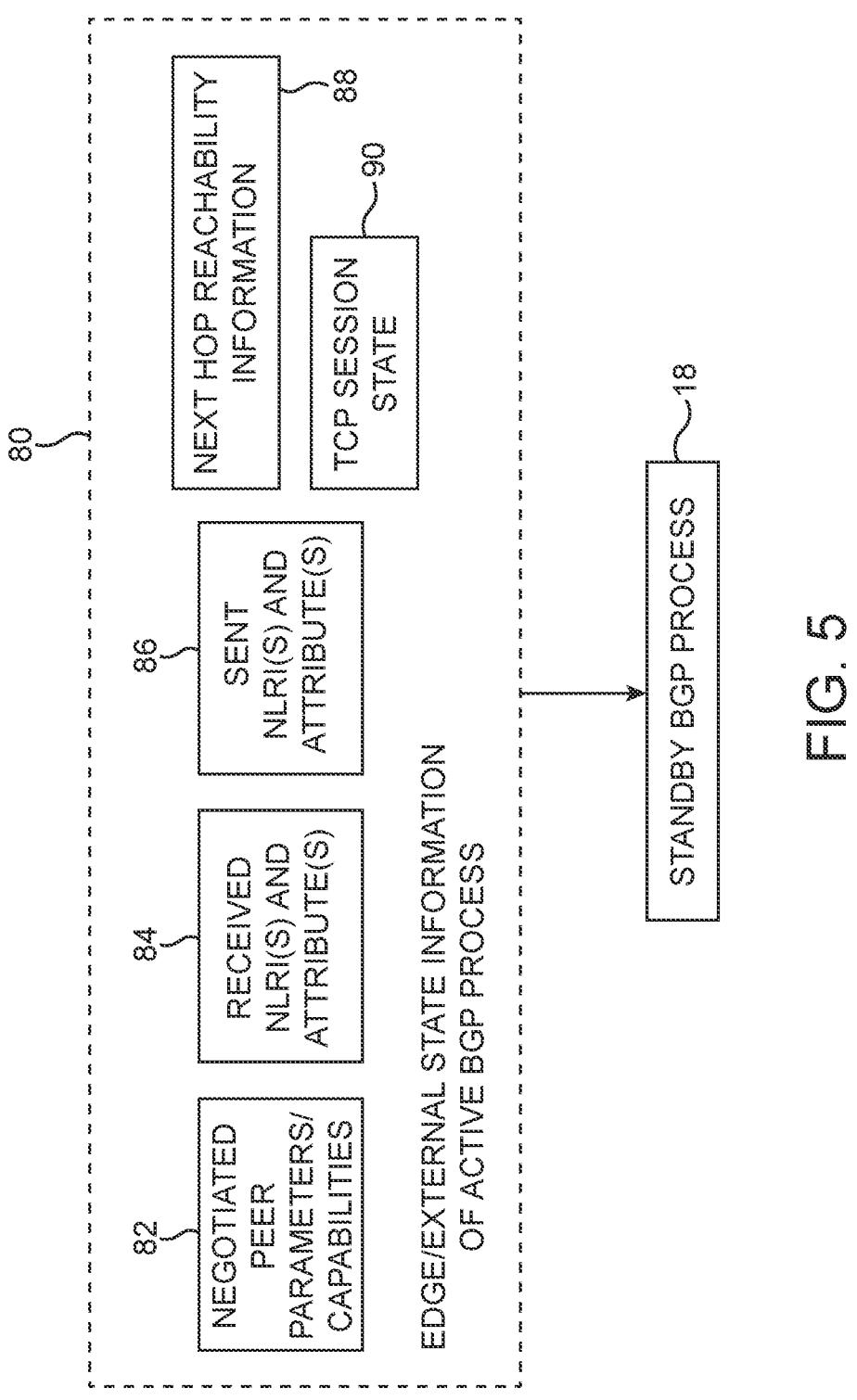
FIG. 5 is a diagram of illustrative edge state information conveyed to a standby BGP process in accordance with some embodiments.

FIG. 5 is a diagram of illustrative edge state, or generally information external to active BGP process 16, that may be conveyed to standby BGP process 18 for synchronization. In the example of FIG. 5, edge state information 80 of active BGP process 16 may include input information (e.g., input states) such as advertised network routing information received in the form of BGP messages conveyed by other peer network devices such as BGP message 50 in FIG. 3. The advertised network routing information may include NLRIs and path attributes 84 (e.g., routes) and/or information indicative of NLRIs and path attributes 84, withdrawn routes, etc. If desired, the input information may also include information indicative of negotiated peer network device parameters and/or capabilities 82 (e.g., received in the form of BGP messages).

Edge state information 80 of active BGP process 16 may include output information (e.g., output states) such as network routing information for advertisement to other peer network devices 30 (e.g., in the form of BGP update message advertising preferred routes generated by active BGP process 16 such as BGP message 50 in FIG. 3). The network routing information for advertisement may include NLRIs and path attributes 86 (e.g., routes) and/or information indicative of NLRIs and path attributes 86, withdrawn routes, etc. If desired, the output information may also include information indicative of negotiated peer network device parameters and/or capabilities 82 (e.g., sent in the form of BGP messages).

Edge state information 80 of active BGP process 16 may also include input information that is not advertised information from peer network devices but still used as inputs for active BGP process 16 such as next hop (e.g., border router) reachability information 88 obtained from one or more routing protocol agents (e.g., protocol agents 40 in FIG. 4), redistributed path information (e.g., path attributes) obtained from one or more routing protocol agents, routing policy information obtained from one or more routing policy agents, etc.

Edge state information 80 of active BGP process 16 may also include other external state information in preparation for BGP switchover such as TCP session state information or TCP session state(s) 90 such as TCP acknowledgement number(s), TCP sequence number(s), and/or other information needed to take over the TCP session over which active BGP process 16 receives and transmits BGP messages with BGP peer network devices.

The different types of edge state information shown and described in connection with FIG. 5 are merely illustrative. If desired, other types of edge or external state information of active BGP process 16 may also be received by and synchronized with standby BGP process 18.

Figure 6:
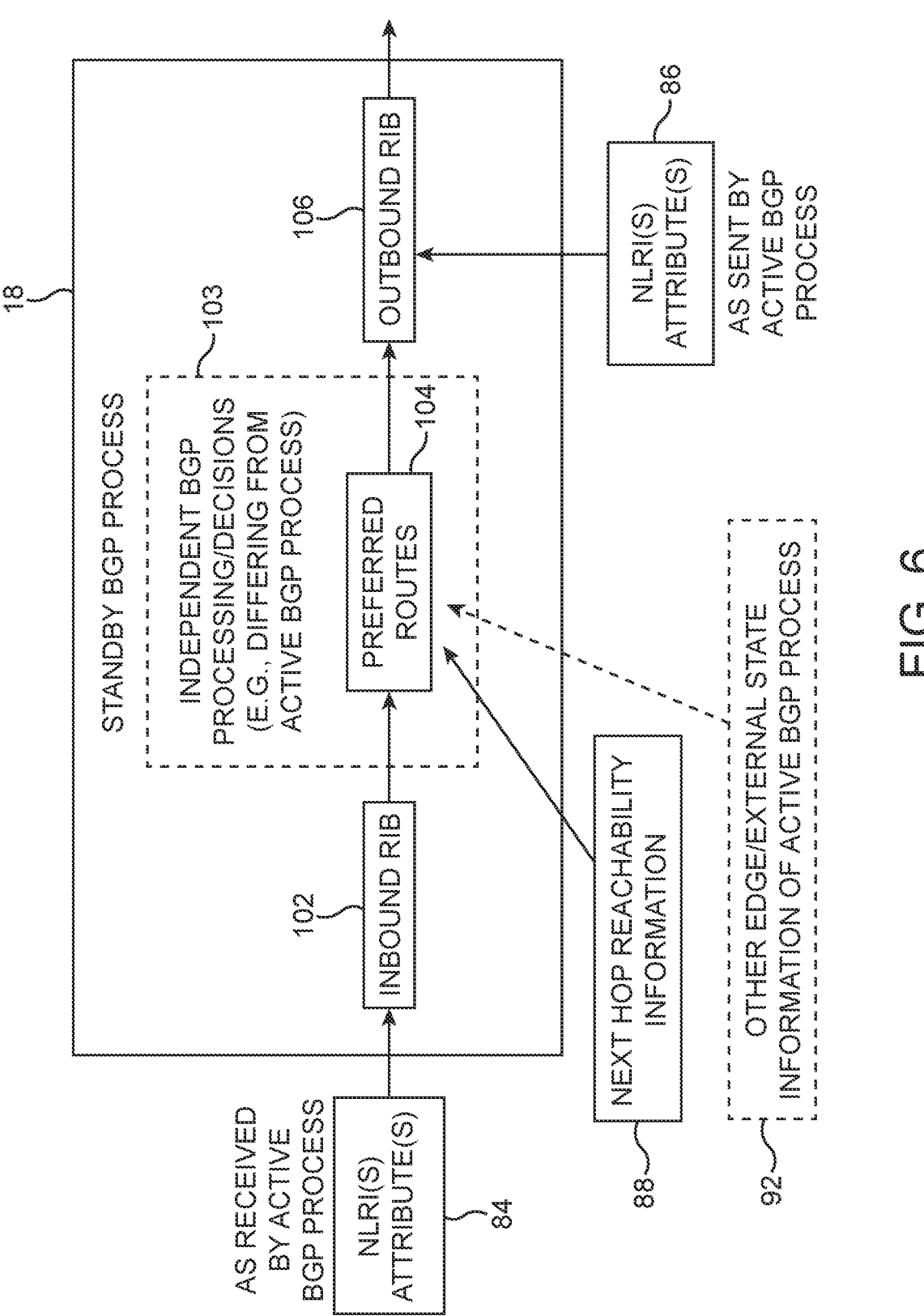
FIG. 6 is a diagram of an illustrative standby BGP process configured to perform independent decision processing by utilizing edge state information in accordance with some embodiments.

FIG. 6 is a diagram of an illustrative standby BGP process operating with edge state information such as the information shown in FIG. 5. As shown in FIG. 6, standby BGP process 18 may receive routing information such as NLRI and path attribute information 84 (e.g., the same routing information as received and stored at inbound RIB 32 for active BGP process 16 in FIG. 2). In such a manner, the input states (e.g., peer-advertised routing information) stored at inbound RIB 32 (FIG. 2) may be synchronized with the input states stored at inbound RIB 102.

Standby BGP process 18 may perform the same type of BGP processing and decision-making 103 (e.g., for a BGP route selection operation) as those described in connection with FIG. 2 for active BGP process 16. In particular, when performing BGP route selection operation, standby BGP process 18 may identify a set of preferred routes 104 (sometimes referred to as (standby) BGP routes) based on the collection of routes stored at inbound RIB 102 (synchronized with inbound RIB 32) and based on other input states. As an example, input states such as next hop reachability information 88 and/or other edge state information 92 used as inputs to active BGP process 16 (e.g., to perform BGP route selection) may also be shared with (e.g., conveyed to) standby BGP process 18 to perform the route selection operation at standby BGP process 18. As described in connection with FIG. 2, other edge state information 92 may include information from policy agent(s) providing routing policy information that influence the route selection process (e.g., by selectively altering path attributes), redistributed paths (e.g., path attributes) from other routing protocol agents (e.g., an IGP protocol agent), etc.

In configurations sometimes described herein as an example, all inputs (e.g., input states) of active BGP process 16 may be shared with or transmitted to standby BGP process 18. Based on these shared inputs, standby BGP process 18 may perform BGP processing and decision-making 103 such as for BGP route selection to generate a collection of preferred routes 104 for storage at a local RIB of standby BGP process 18. Similar to active BGP process 16, standby BGP process 18 may perform comparisons (between the path attributes in the order as described in connection with FIG. 2) to identify a best path out of multiple paths to the same network prefix or destination(s) defined by the NLRI, thereby identifying a preferred route for storage at the local RIB of standby BGP process 18.

BGP processing and decisions 103 for standby BGP process 18, which are sometimes described herein in the context of the BGP route selection operation, may be performed independently of the corresponding BGP process and decisions for the route selection operation performed at active BGP process 16. In other words, the execution of the route selection operation for standby BGP process 18 is not synchronized with the execution of the route selection operation for active BGP process 16 even though the two BGP processes receive the same input states. Configured in this manner (e.g., by synchronizing edge states and not internal states), the active and standby BGP processes may desirably operate respective route selection operations independently or not in locked step, which removes the need for resource-intensive enforcement of locked-step operation between the two BGP processes. This may further allow for the two BGP processes to have different implementations, if desired.

Since both BGP processes operate (e.g., make route selection decisions) using the same synchronized input states, the resulting preferred routes 34 at the local RIB of active BGP process 16 and the resulting preferred routes 104 at the local RIB of standby BGP process 18 may still be quite similar. In fact, internal states such as preferred routes 34 of active BGP process 16 may be intentionally left unsynchronized with preferred routes 104 of standby BGP process 18. In other words, the set of preferred routes 34 at the local RIB of active BGP process 16 may differ from the set of preferred routes 104 at the local RIB of standby BGP process 18. As an example, for the same network (IP) prefix or destination(s), active BGP process 16 may determine that a first path is the best path and therefore install that route in its local RIB, while standby BGP process 18 may determine that a second different path is the best path and therefore install the different route in its local RIB. Even with the same input states, active BGP process 16 and standby BGP process 18 may arrive at different best paths for the same destination(s) due to timing-sensitive and/or order-sensitive (path attribute) comparisons, as an example.

Consequently, some of the preferred routes selected for advertisement stored in outbound RIB 106 for standby BGP process 18 may also differ from some of the preferred routes selected for advertisement stored in outbound RIB 36 for active BGP process 16. In particular, while standby BGP process 18 (e.g., when serving standby functions prior to replacing active BGP process 16 as a new active BGP process in response to a failure event) may not actually advertise any routes to BGP peer network devices, the collection of routes stored at outbound RIB 106 may represent the routing information that standby BGP process 18 would have sent if it were the active BGP process.

In scenarios in which the routes advertised to peer network devices by active BGP process 16 differ from routes (to the same destinations or for the same NLRIs) that standby BGP process 18 would have advertised, standby BGP process 18 may reconcile these differences in advertised routes upon initiation of the BGP switchover.

In particular, standby BGP process 18 may also receive outputs states of active BGP process 16 (e.g., routing information for advertisement such as NLRI and path attribute information 86 stored at outbound RIB 36 in FIG. 2 and advertised to peer network devices). In other words, the output states (e.g., routing information for advertisement) stored at outbound RIB 36 (FIG. 2) may be synchronized with the output states stored at inbound RIB 106. As such, standby BGP process 18 may determine or identify any differences between routes advertised by active BGP process 16 and routes that standby BGP process 18 would have advertised based on the receipt of output states of active BGP process 16. Standby BGP process 18 may store indications of these differences (e.g., route(s) advertised by active BGP process 16, route(s) that would have been advertised by standby BGP process 18, etc.) such that reconciliation can be performed at a later time based on these stored indications. At BGP switchover, when standby BGP process 18 becomes the new active BGP process, BGP process 18 may distribute (e.g., advertise to one or more peer network devices 30) any routing information necessary to reconcile these differences in BGP update messages to peer network devices, as desired.

As an example, active BGP process 16, prior to switchover, may have advertised a first route (e.g., for destinations defined by NLRI) stored at outbound RIB 36 to one or more peer network devices 30. Output states stored at outbound RIB 36 (including the above-mentioned first route) may be synchronized with or received by standby BGP process 18. Standby BGP process 18 may determine that the first route advertised by active BGP process 16 for the destinations differs from a second route that standby BGP process 18 would have sent for the same destinations defined by the same NLRI. Standby BGP process 18 may store an indication of this route difference for the same destinations. To reconcile this difference, BGP process 18 (at switchover) may send BGP update messages to the one or more peer network devices indicating the second route (and/or withdrawing the first route).

In scenarios in which some routes advertised by active BGP process 16, prior to switchover, are the same as those that standby BGP process 18 would have itself advertised, no BGP update messages may be required (at switchover) for these routes (e.g., each of the same routes for the same destinations stored at both outbound RIB 36 of active BGP process 16 and outbound RIB 106 of standby BGP process 18). In other words, at or prior to switchover, standby BGP process 18 may make a determination that one or more routes for corresponding destination(s) advertised by active BGP process 16 (e.g., stored at outbound RIB 36) are also stored at outbound RIB 106 (e.g., are routes for those destination(s) that standby BGP process 18 would have advertised if it were the active BGP process).

Figure 7:
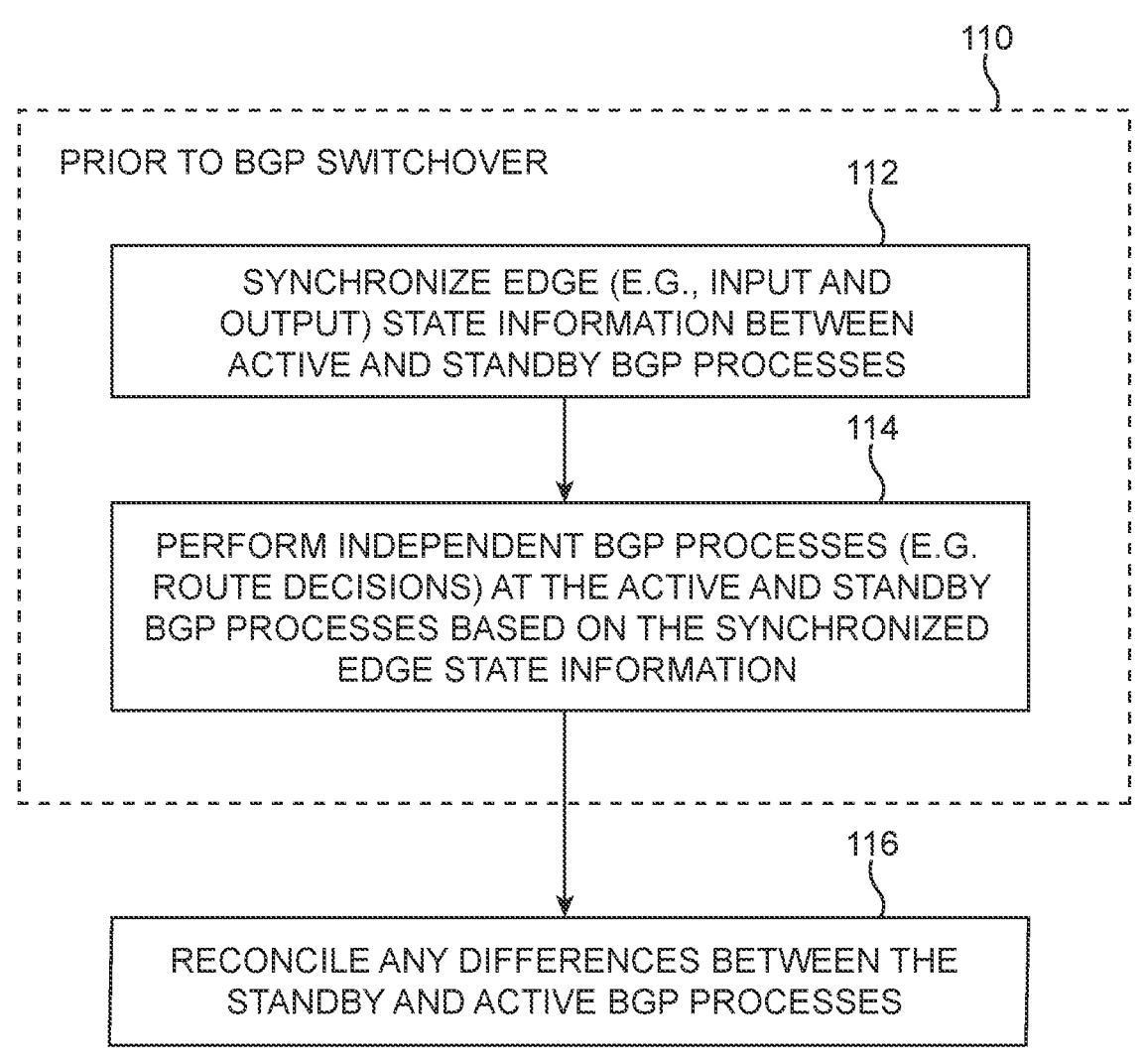
FIG. 7 is a flowchart of illustrative operations for preparing for and/or performing a BGP switchover in accordance with some illustrative embodiments.

FIG. 7 is a flowchart illustrating how a standby BGP process such as standby BGP process 18 (FIGS. 1 and 4-6) may be executed relative to an active BGP process such as active BGP process 16 (FIGS. 1, 2, and 4) in preparation for and at BGP switchover. The illustrative operations described in connection with active BGP process 16 and standby BGP process 18 in FIG. 7 may generally be performed using processing circuitry (e.g., by executing software instructions stored on corresponding memory circuitry) such as processing circuitry 14 in network device 10, processing circuitry in network device 10', and/or processing circuitry on other computing equipment in system 8 (FIG. 1), depending on the configuration of active BGP process 16 and standby BGP process 18.

As shown in FIG. 7, operations performed at blocks 112 and 114 may be performed at a time period 110 prior to and in preparation for BGP (process) switchover, while operations performed at block 116 may be performed at or during the BGP process switchover (e.g., upon initiation of BGP switch and/or in response to detection of a failure event that disrupts operation of the active BGP process).

At block 112, a single processor or multiple different processors may execute software instructions (e.g., stored on memory circuitry communicatively coupled to the processing circuitry) to synchronize edge (e.g., input and output) state information between active BGP process 16 and standby BGP process 18. If desired, respective synchronization managers executing on the same processing circuitry as active BGP process 16 and the same processing circuitry as standby BGP process 18 may be used to orchestrate and/or manage the synchronization of edge states.

As examples described in connection with FIGS. 4-6, the synchronization of edge states may include synchronization (e.g., sharing) of input states stored at inbound RIBs 32 and 102 between active BGP process 16 and standby BGP process 18, synchronization (e.g., sharing) of other input states (e.g., next hop reachability information, routing policy information, routing protocol information such as redistributed routes, etc.) for performing route selection between active BGP process 16 and standby BGP process 18, synchronization (e.g., sharing) of output states stored at outbound RIBs 36 and 106 between active BGP process 16 and standby BGP process 18, and/or synchronization (e.g., sharing) of other edge states (e.g., TCP state information such as TCP acknowledgement numbers, TCP sequence numbers, etc.) in preparation of BGP switchover between active BGP process 16 and standby BGP process 18. Notably, internal states such as those stored at the local RIBs of active BGP process 16 and of standby BGP process 18 may not be synchronized or shared therebetween.

At block 114, a single processor or multiple different processors may execute software instructions to perform independent BGP processes (e.g., route selection operations and decisions resulting therefrom, route advertisement decisions) at active BGP process 16 and standby BGP process 18 based on the synchronized edge state information. In particular, active BGP process 16 and standby BGP process 18 may receive the same (shared) input states for performing route selection. Standby BGP process 18 may perform route selection independently of route selection performed at active BGP process 16. As such, the collection of preferred routes stored at the respective local RIBs and/or the subset of preferred routes stored at respective outbound RIBs may differ between active BGP process 16 and standby BGP process 18.

While FIG. 7 shows block 112 as succeeding block 114 in order, this is merely illustrative. If desired, the operations at blocks 112 and 114 may occur at least partly concurrently and/or in any other suitable order.

At block 116, a single processor or multiple different processors may reconcile any differences between active BGP process 16 and standby BGP process 18 during the BGP switchover (e.g., at the initiation of BGP switchover in response to the failure event disrupting active BGP process 16, at a time after the initiation of BGP switch but prior to BGP process 18 being promoted to a new active BGP process, etc.). In particular, standby BGP process 18 may send BGP update messages to one or more peer network devices 30 to reconcile any identified differences between routes advertised by active BGP process 16 prior to BGP switchover (previously stored at outbound RIB 36) and routes intended to be advertised by standby BGP process 18 (stored at outgoing RIB 106). These BGP update messages may include active BGP routes now out-of-date due to BGP switchover (e.g., routes previously advertised by the no longer active BGP process 16) as withdrawn routes, replacement routes (e.g., routes standby BGP process 18 had wanted to advertise prior to BGP switchover) as replacements for the out-of-date routes as routes for advertisement, and/or any other routes for advertisement.

The methods and operations described above in connection with FIGS. 1-7 may be performed by the components of one or more network devices or other computing equipment using software, firmware, and/or hardware (e.g., dedicated circuitry or hardware). Software code for performing these operations may be stored on non-transitory computer readable storage media (e.g., tangible computer readable storage media) stored on one or more of the components on one or more network devices or other computing equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of one or more network devices or other computing equipment (e.g., processing circuitry such as processing circuitry 14 on network device 10 of FIG. 1, processing circuitry on network device 10' of FIG. 1, or generally processing circuitry within networking system 8 of FIG. 1).

The foregoing is merely illustrative and various modifications can be made to the described embodiments. The foregoing embodiments may be implemented individually or in any combination.

What is claimed is:

1. A method for border gateway protocol (BGP) switchover, the method comprising:

receiving, by an active BGP process, a set of input states;

executing the active BGP process based on the set of input states;

receiving, by a standby BGP process, the set of input states; and executing the standby BGP process based on the set of input states independently of executing the active BGP process based on the set of input states.

2. The method defined in claim 1, wherein executing the active BGP process based on the set of input states produces a set of output states for transmission to one or more BGP peer network devices, the method further comprising:

receiving, by the standby BGP process, the set of output states.

3. The method defined in claim 2, wherein executing the active BGP process based on the set of input states produces a set of internal states based on which the set of output states is produced, the method further comprising:

not receiving, by the standby BGP process, the set of internal states.

4. The method defined in claim 3, wherein the set of internal states comprises a collection of routes stored at a local routing information base (RIB) of the active BGP process.

5. The method defined in claim 4, wherein the collection of routes stored at the local RIB of the active BGP process is not synchronized with a collection of routes stored at a local RIB of the standby BGP process.

6. The method defined in claim 1, wherein executing the active BGP process based on the set of input states produces a first result and wherein executing the standby BGP process based on the set of input states produces a second result that differs from the first result.

7. The method defined in claim 6, wherein the first result comprises a first preferred route defining a first path to a destination network address and wherein the second result comprises a second preferred route defining a second path to the destination network address.

8. The method defined in claim 7 further comprising:

reconciling a difference between the first preferred route and the second preferred route in response to initiating the BGP switchover.

9. The method defined in claim 8 further comprising:

advertising, by the active BGP process, the first preferred route to a BGP peer network device; and receiving, by the standby BGP process, the first preferred route, wherein reconciling the difference between the first preferred route and the second preferred route comprises sending a BGP update message to the BGP peer network device indicating the second preferred route.

10. The method defined in claim 1, wherein the set of input states comprises routing information advertised by one or more BGP peer network devices and wherein the advertised routing information is conveyed from the active BGP process to the standby BGP process.

11. The method defined in claim 10, wherein executing the active BGP process based on the set of input states identifies a first set of preferred routes for the active BGP process and wherein executing the standby BGP process based on the set of input state identifies a second set of preferred routes for the standby BGP process that differs from the first set of preferred routes.

12. The method defined in claim 11 further comprising:
identifying, by the active BGP process, first routes for advertisement from the first set of preferred routes; and
identifying, by the standby BGP process, second routes for advertisement from the second set of preferred routes, the second routes for advertisement differing from the first routes for advertisement, wherein the first routes for advertisement are advertised prior to initiation of the BGP switchover and wherein the second routes for advertisement are not advertised prior to the initiation of the BGP switchover.

13. The method defined in claim 12 further comprising:
storing, by the active BGP process, the routing information advertised by the one or more BGP peer network devices at an inbound routing information base (RIB) for the active BGP process;
storing, by the standby BGP process, the routing information advertised by the one or more BGP peer network devices at an inbound RIB for the standby BGP process;
storing, by the active BGP process, the first set of preferred routes at a local RIB for the active BGP process;
storing, by the standby BGP process, the second set of preferred routes at a local RIB for the standby BGP process;
storing, by the active BGP process, the first routes for advertisement at an outbound RIB for the active BGP process; and
storing, by the standby BGP process, the second routes for advertisement at an outbound RIB for the standby BGP process.

14. Non-transitory computer-readable storage media comprising computer-executable instructions that, when executed by one or more processors for a networking system, cause the one or more processors to:
receive, by a standby border gateway protocol (BGP) process, routing information advertised by one or more BGP peer network devices from an active BGP process;
perform, by the standby BGP process, BGP route selection based on the routing information advertised by the one or more BGP peer network devices to identify a first BGP route for a destination stored at a local routing information base (RIB) for the standby BGP process, wherein the first BGP route differs from a second BGP route for the destination identified by the active BGP process and advertised by the active BGP process to at least some of the one or more BGP peer network devices, wherein the BGP route selection is performed by the standby BGP process to identify the first BGP route during a time period prior to an initiation of a BGP switchover that promotes the standby BGP process to a new active BGP process, and wherein the second BGP route is identified by the active BGP process during the time period prior to the initiation of the BGP switchover; and send, after the initiation of the BGP switchover, a BGP update message indicating the first BGP route for the destination.

15. The non-transitory computer-readable storage media defined in claim 14 further comprising computer-executable instructions that, when executed by the one or more processors for the networking system, cause the one or more processors to:
receive, by the standby BGP process, routing information for advertisement by the active BGP process, wherein the routing information for advertisement by the active BGP process includes the second BGP route for the destination.

16. The non-transitory computer-readable storage media defined in claim 15 further comprising computer-executable instructions that, when executed by the one or more processors for the networking system, cause the one or more processors to:
identify, by the standby BGP process, a difference between the second BGP route and the first BGP route, wherein the BGP update message is sent based on the identified difference.

17. The non-transitory computer-readable storage media defined in claim 14 further comprising computer-executable instructions that, when executed by the one or more processors for the networking system, cause the one or more processors to:
receive, by the standby BGP process, routing policy information and next hop reachability information as received by the active BGP process, wherein the BGP route selection performed by the standby BGP process is based on the routing policy information and the next hop reachability information.

18. The non-transitory computer-readable storage media defined in claim 14 further comprising computer-executable instructions that, when executed by the one or more processors for the networking system, cause the one or more processors to:
perform, by the standby BGP process, the BGP route selection based on the routing information advertised by the one or more BGP peer network devices to identify a third BGP route for the destination stored at the local RIB for the standby BGP process, wherein the third BGP route is the same as the second BGP route for the destination identified by the active BGP process and advertised by the active BGP process to at least some of the one or more BGP peer network devices; and
make a determination, based on the third BGP route being the same as the second BGP route, not to send a BGP update message indicating the third BGP route for the destination.

19. A method of executing a standby border gateway protocol (BGP) process configured to replace an active BGP process in response to a failure event, the method comprising:
receiving, by the standby BGP process, routing information as received from one or more BGP peer network devices by the active BGP process;
executing the standby BGP process based on the received routing information to identify standby routes for advertisement, wherein the standby routes for advertisement differ from active routes for advertisement identified by the active BGP process and advertised, prior to the failure event, to at least some of the one or more BGP peer network devices; and reconciling a difference between the standby routes for advertisement and the active routes for advertisement after the failure event.

20. The method defined in claim 19, wherein the standby routes for advertisement are identified by the standby BGP process based on preferred routes of the standby BGP process stored at a local routing information base (RIB) for the standby BGP process, wherein the active routes for advertisement are identified by the active BGP process based on preferred routes stored at a local RIB for the active BGP process, and wherein the preferred routes stored at the local RIB for the active BGP process are not conveyed to the standby BGP process.

\* \* \* \* \*